May 5, 1970   F. E. RUSSELL ET AL   3,510,766
PROBE DEVICE HAVING A PAIR OF ALIGNED TUBULAR SECTIONS
FOR DETECTING ELECTRIC LEAKAGE
Filed Feb. 1, 1968

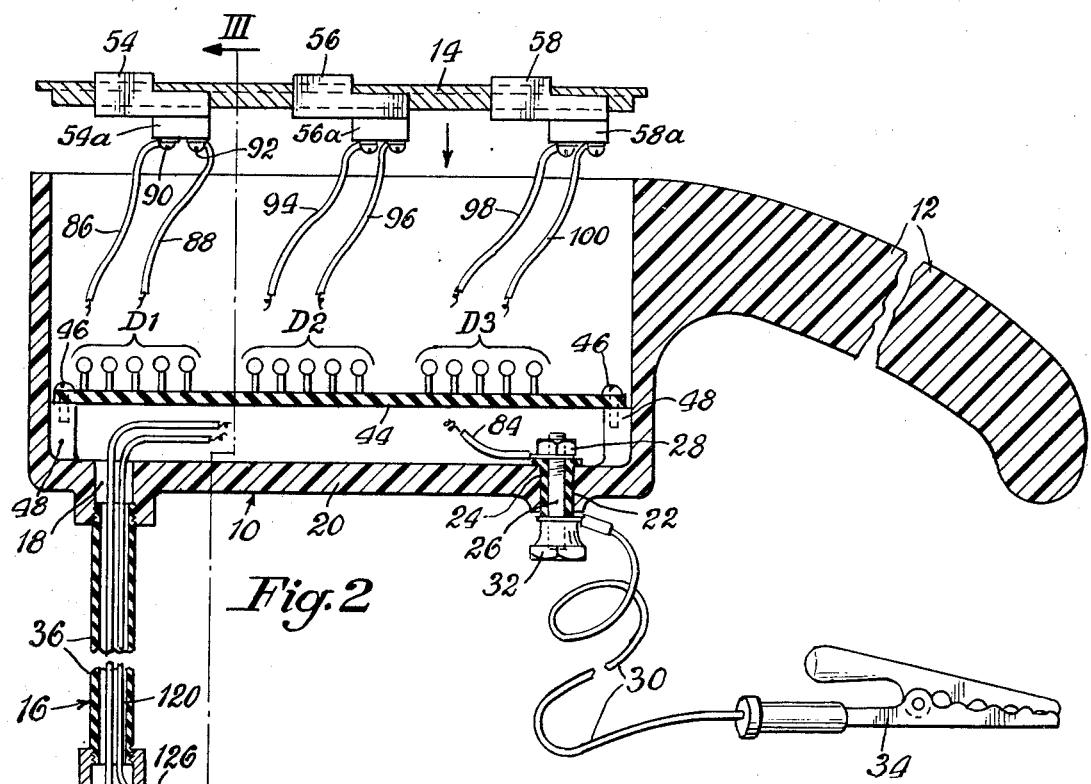
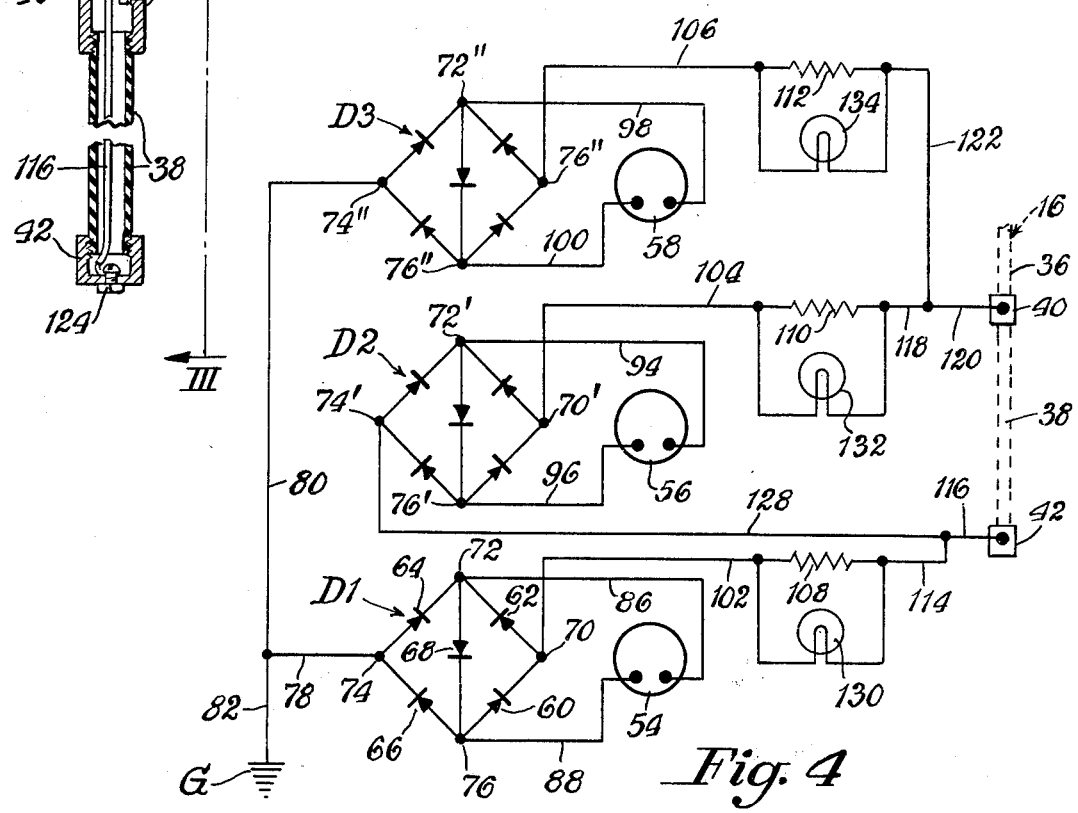
Fig. 2
Fig. 4

United States Patent Office 3,510,766
Patented May 5, 1970

1

3,510,766
PROBE DEVICE HAVING A PAIR OF ALIGNED TUBULAR SECTIONS FOR DETECTING ELECTRIC LEAKAGE
Fred E. Russell, Elgin, and Charles E. Russell, Wayne, Ill., assignors to Saftematic, Inc., St. Charles, Ill., a corporation of Illinois
Filed Feb. 1, 1968, Ser. No. 702,453
Int. Cl. G01r 1/06
U.S. Cl. 324—72.5
5 Claims

ABSTRACT OF THE DISCLOSURE

A probe for detecting faults and leaks of an electrical nature in damp or water-filled excavations, flooded basements and other places and for pinpointing the source of such faults or leaks by observation of indicator means on said probe actuated by the fault or leakage charge or current when the probe is connected to ground.

This invention relates to a probe for detecting faults and leaks of an electrical nature.

It is a well known fact that electrical leakage into water and other liquids constitutes a source of potential danger to life and property. Such danger occurs, for example, in swimming pools, fountains, mines and other damp or water-filled excavations, flooded basements, boat harbors and many other places. The source of the leakage may be of various kinds, such as bare or insufficiently insulated electric wires or other conductive elements, underwater electric lights, accidentally submerged electric appliances, and the like.

The primary object of the present invention is to provide a probe of a simple, durable, sensitive, and thoroughly reliable nature by means of which electrical leakage of any kind can be conveniently and safely detected before any harm is done.

Another object of the invention is to provide a probe of the kind and for the purpose indicated by means of which the source of the electric leakage can be readily pinpointed.

A further object of the invention is to provide a probe of the kind indicated which itself is entirely safe, in that it requires no batteries or connections with outside electrical sources for ts function.

Figure 1:
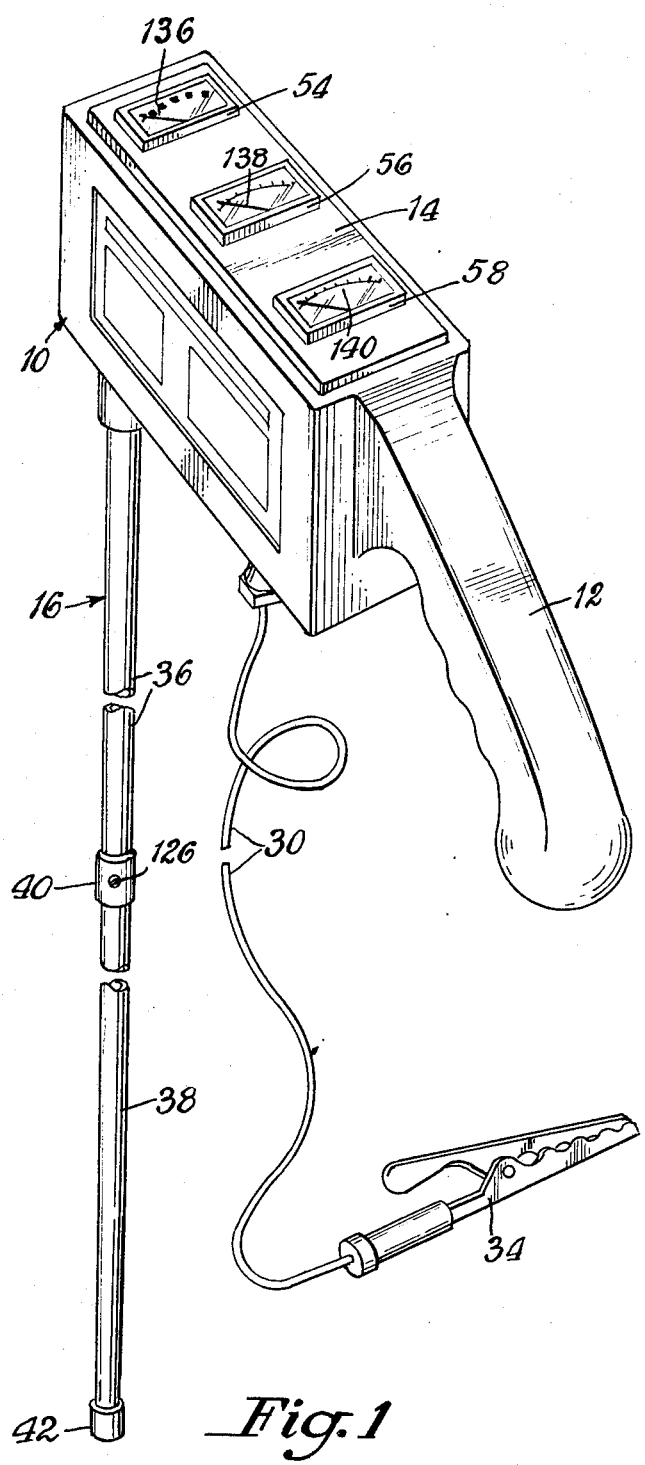
Figure 3:
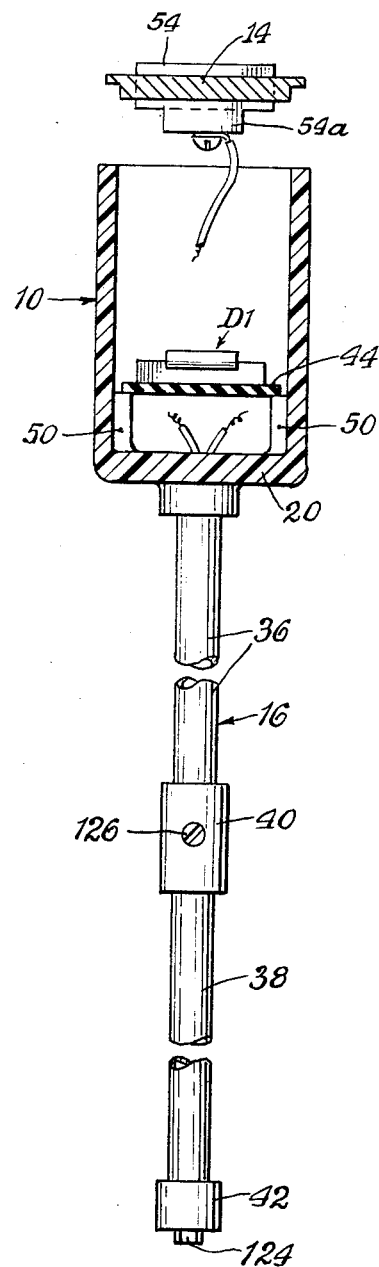
Figure 5:
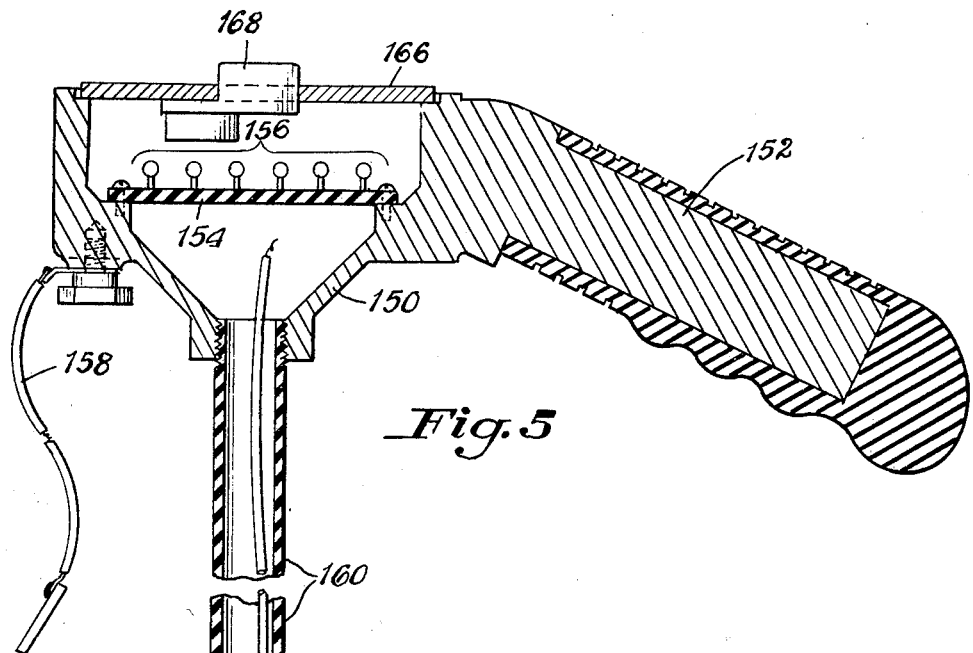
Figure 6:
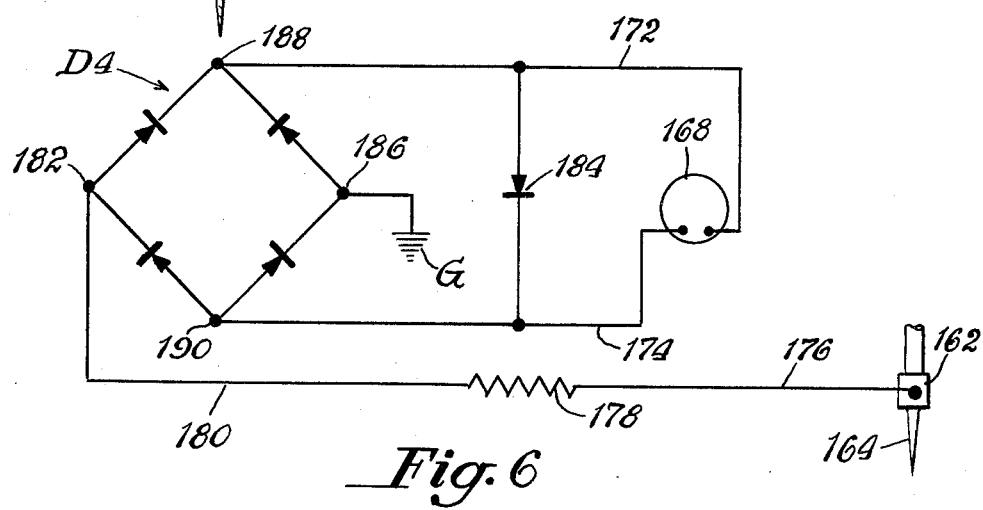

Other objects and advantages of the invention will become apparent from the following description thereof taken in conjunction with the accompanying drawings in which:

FIG. 1 is a perspective view of an embodiment of the invention, particularly well adapted for use in connection with swimming pools and other similar accumulations of water, FIG. 2 shows a vertical cross-sectional view, partly exploded, of the embodiment of FIG. 1, FIG. 3 is a section on line III—III of FIG. 2, FIG. 4 shows diagrammatically the circuitry of the embodiment of FIGS. 1–3, FIG. 5 is a vertical cross-sectional view similar to that of FIG. 2 but relating to a modified embodiment of the invention, and FIG. 6 shows diagrammatically the circuitry of the embodiment of FIG. 5.

In the embodiment of FIGS. 1–4, the probe comprises a housing 10 made of any suitable material, such as cast metal or molded plastics. The housing 10 is provided at one end with an integral or otherwise attached handle 12, and the open top of the housing 10 is in the assembled condition of the probe hermetically closed by a lid 14, secured in position by any suitable means, not shown.

2

An elongated, hollow probe rod 16 is detachably secured in an opening 18 (FIG. 2) in the bottom wall 20 of the housing 10, and in another opening 22 in said bottom wall 20 there is provided a sleeve 24 which in the case of a housing made of electrically conductive material is made of electrically non-conductive material. A conductive bolt 26 extends through said sleeve 24 and is secured by means of a nut 28 within the housing 10. The terminal of an electric cord 30 is clamped between the head 32 of the bolt 26 and the end of the sleeve 24, as shown in FIG. 2, and the cord 30 has its other end connected to a grounding clamp 34.

The probe rod 16 comprises two aligned tubes 36, 38 of electrically non-conductive material which are secured together by means of a conductive metal sleeve 40 threaded onto the adjacent ends of the tubes 36, 38 and sealed in relation thereto. The free end of the lower tube 38 is provided with a conductive closure cap 42 which is similarly threaded and sealed thereon. The connection between the tube 36 and the housing 10 is, of course, also tightly sealed.

Within the housing 10 in a position where it is readily accessible upon removal of the lid 14, there is provided a circuit board 44 made of electrically insulating material. Said board 44 is secured by means of screws 46 threadedly engaging projections 48 which are integral with the housing 10. Similar projections 50 are provided at intervals along the interior perimeter of the housing 10 as additional supports for the circuit board 44. Various components of the circuitry, described in detail below, are mounted on the board 44 and indicated D1, D2, and D3.

In the lid 14 there are mounted three indicator instruments 54, 56, 58, to be described below, and each of said indicator instruments has a portion 54a, 56a, 58a extending to the inside of the lid 14 for attachment of wire elements, as indicated and as further explained below.

In the present embodiment, the circuit components D1, D2, D3 comprise diodes which conveniently are mounted in three groups on the circuit board 44, as shown. Within each of said groups D1, D2, D3 there are five diodes which as an example in group D1 are marked 60, 62, 64, 66, 68 and arranged and interconnected in the familiar rectifier pattern shown in FIG. 4 to form junction 70 between diodes 60 and 62, junction 72 between diodes 62, 64 and 68, junction 74 between diodes 64 and 66, and junction 76 between diodes 66, 60 and 68. Corresponding junctions in groups D2 and D3 bear the same reference numerals with the addition of one prime and two primes, respectively.

The junctions 74 and 74″ are connected to ground G by conduits 78, 80, 82 which in FIG. 2 are collectively represented by the elements 34, 30, 26 and the partly shown wire 84. The junctions 72 and 76 in rectifier group D1 are connected to the indicator instrument 54 by conduits 86 and 88, respectively, which in FIG. 2 are represented by the partly shown wires 86, 88 secured to the indicator instrument portion 54a by screws 90 and 92, respectively. In a similar manner the junctions 72′, 76′ in rectifier D2 are connected to the indicating instrument 56 by conduits 94, 96 which in FIG. 2 are represented by the partly shown wires bearing the same reference numerals. Corresponding arrangements in connection with the indicator instrument 58 in rectifier D3 are represented by the elements bearing reference numerals 98, 100.

Each of the junctions 70, 70′ and 70″ is connected by a conduit 102, 104 and 106, respectively, to one terminal of an individual resistor 108, 110 and 112, respectively. The other terminal of the resistor 108 is connected by conduits 114, 116 to the end cap 42 on the probe rod 16. Similarly, the other terminals of the resistors 110, 112 are connected by conduits 118, 120 and 122, 120, respectively, with the conductive sleeve 40 on the probe rod 16. The conduit 116 is represented in FIG. 2 by the broken wire 116 which is secured to the cap 42 by a screw 124, and the conduit 120 is shown in FIG. 2 as a broken wire 120 secured to the sleeve 40 by a screw 126. The conduit 116 is connected to junction 74' by a conduit 128. The resistors 108, 110, 112 are mounted on the board 44, although not shown in FIGS. 2 and 3, and each of them is combined with a shunted signal light 130, 132, 134, respectively, which are suitably mounted in the respective indicator instruments 54, 56, 58 and may serve to illuminate the dials thereof which together with corresponding movable indicator hands are diagrammatically indicated in FIG. 1 at 136, 138, 140, respectively. The scale gradations on the dials 136, 138, 140 will be discussed below.

The tube 36 and/or the tube 38 may be made foldable by the aid of suitable hinge means, not shown, or one or both may be composed of telescoping parts, not shown, in which case it may be advisable to provide the wires 116, 120 partly or entirely in the form of coils. Apparently, such modifications are within the realm of knowledge of anyone skilled in the art. In using the probe described above for investigating, for example, a water-filled swimming pool for possible electrical leakage, the probe rod 16 is lowered into the water. If there is electric leakage to the surface portion of the water, one, two or all three indicators 54, 56, 58 will immediately react depending upon the amount of leakage and upon the capacities of the resistors 108, 110, 112. Due to the use of rectifiers in the circuitry, this is true of alternating current as well as of direct current and even of static electricity.

As the probe rod is lowered deeper, the reaction of the indicator instruments will vary depending upon the amount of leakage at successive depths, and as the sleeve 40 enters the water, any difference in leakage at the levels of said sleeve 40 and the cap 42 will cause an enhanced reaction specifically on the indicator 56 which is most directly connected with both the sleeve 40 and the cap 42, as is obvious from FIG. 4.

It is obvious that the type of scale gradation on the dials 54, 56, 58 is to a considerable extent immaterial, particularly in the case of a portable probe. Each scale could, for example, have a uniform gradation from zero to ten, since it is normally not of primary interest to learn the amount of leakage as expressed in amperes, voltage or any other electrical units. The important thing is to obtain a comparison between the indications on the three instruments, and with a minimal amount of practice, the user of the probe will rapidly be able to make such a comparison and by moving the probe in the water determine where or at what level the leakage is most pronounced. In other words, by reading the three instruments continuously while the probe is being moved around, the user will be able to pinpoint the location of the source of the leakage.

It will be obvious to a person skilled in the art that the probe would function in a similar manner even without the branch circuit containing the indicator 58, for example, although with proper relative dimensioning of the three resistors 108, 110, 112 the combined reading of the instruments will be more informative as to the location of the leakage source than would be the case with only the two instruments 54, 56. As a matter of fact, it has been found that an efficient probe is obtained by using only one of the branch circuits corresponding to the groups D1, D2 and D3 and omission of the conductive sleeve 40. Such a modified embodiment is shown in FIGS. 5 and 6.

In this modified embodiment, a housing 150 is provided with a handle 152, and within the housing 150 a circuit board 154 is mounted carrying circuit components 156, all in substantial correspondence with the embodiment of FIGS. 1–4. Also, similarly there is provided a ground connection 158 and a tubular probe rod 160 of electrically insulating material. The free end of the probe rod 160 is provided with a conductive closure cap 162 which in this case is shown provided with a pointed probe pin or blade 164 which may be of considerable length for ready insertion in cracks in concrete walls and the like. The cap 42 of FIGS. 1–4 may, of course, be of similar design, if desired, and, similarly, the clamp 34 may be replaced with a pin or blade. The lid 166 has only one indicator instrument 168 mounted therein which is provided with means corresponding to members 54a, 90 and 92 in FIG. 2 for attachment of wires (not shown) thereto.

Said lastmentioned wires as well as a wire 170 extending within the tubular rod 160 and connected to the cap 162 are represented in the diagram of FIG. 6 by the conduits 172, 174 and 176, respectively. A resistor 178 is connected to the conduit 176 and by a conduit 180 to a junction 182 in a group of diodes D4 which includes the diode 184 and corresponds to one of the rectifier groups in FIG. 4. The junction 186 is grounded at G, and the junctions 188, 190 are connected to the poles of the indicator instrument 168, as shown.

The sensitivity of the probe of this invention may be made extremely great by proper choice of the circuitry components. In fact, some probes made according to the invention have been found to react if brought into a neon-lighted room and simply connected to ground. Various modifications of the components and their combinations will be evident to those skilled in the art.

What is claimed is:

1. A probe for detecting electric leakage, comprising a closed housing with a handle secured thereto, an elongated tubular probe rod of non-conductive material, means sealingly securing said probe rod to said housing, an end cap of electrically conductive material, means sealingly securing said end cap to the free end of said probe rod, said probe rod comprising two aligned tubular sections, a sleeve-like member of conductive material releasably joining said sections with each other, two indicating instruments mounted in a wall of said housing and having dials visible from outside said housing, electrical circuit components mounted within said housing and including a first and a second rectifier, each comprising five diodes interconnected to form four junctions therebetween, first conduit means connecting a pair of said junctions in said first rectifier with one of said indicator instruments to ensure unchanging polarity thereto, second conduit means connecting the corresponding pair of junctions in said second rectifier with the other one of said indicator instruments, third conduit means connecting one of the remaining two junctions in said first rectifier with ground, fourth conduit means connecting the other remaining junction in said first rectifier with said probe rod end cap, first resistor means connected in said fourth conduit means, fifth conduit means connecting said probe rod end cap with one of the remaining junctions in said second rectifier, sixth conduit means connecting the other remaining junction in said second rectifier with said conductive metal sleeve on the probe rod, and second resistor means connected in said sixth conduit means, whereby said indicator instruments will react in varying degrees for electric leakage in contact with the probe rod end cap alone, with the conductive metal sleeve alone, and with the end cap and the sleeve simultaneously.

2. The probe as set forth in claim 1, including a third rectifier, a third indicator instrument, conduit means interconnecting said third rectifier with said third indicator instrument and with ground as in the case of the first such means, seventh conduit means connecting the remaining junction in said third rectifier with said conductive metal sleeve, and third resistor means connected in said seventh conduit means.

3. The probe as set forth in claim 1, in which said circuit components are mounted on an insulated circuitry board within said housing.

4. The probe as set forth in claim 1, including an elongated slender member of conductive material projecting from said end cap for probing in cracks in concrete walls and the like.

5. A probe for detecting electric leakage, comprising a closed housing with a handle secured thereto, an elongated tubular probe rod of non-conductive material, means sealingly securing said probe rod to said housing, an end cap of electrically conductive material, means sealingly securing said end cap to the free end of said probe rod, said probe rod comprising two aligned tubular sections, a sleeve-like member of conductive material releasably joining said sections with each other, at least two indicator instruments mounted in a wall of said housing and having dials visible from outside said housing, electrical circuit components mounted within said housing and including at least two rectifiers and two resistors, and electric wiring means connecting one of said rectifiers and one of said resistors with each other and with one of said indicator instruments, with said probe rod end cap, and with ground, said electric wiring means also connecting the other rectifier and resistor with each other, with the other indicator instrument, with said sleeve-like member, and with ground, whereby said indicator instruments will react in varying degrees for electric leakage in contact with the probe rod end cap alone, with the conductive metal sleeve alone, and with the end cap and the sleeve simultaneously.

References Cited

UNITED STATES PATENTS

| 1,610,563 | 12/1926 | McIlvaine. | |
| 2,091,521 | 8/1937 | Pattison | 324—51 |
| 2,094,645 | 10/1937 | Foulke | 324—72.5 XR |
| 2,422,644 | 6/1947 | Martenet | 324—54 |
| 2,907,949 | 10/1959 | Rogers et al. | 324—52 |
| 3,320,524 | 5/1967 | Miller | 324—54 |

FOREIGN PATENTS

| 476,228 | 12/1937 | Great Britain. |
| 683,997 | 12/1952 | Great Britain. |

GERARD R. STRECKER, Primary Examiner

U.S. Cl. X.R.

324—149